United States Patent
Collier-Hallman et al.

(10) Patent No.: US 6,791,217 B2
(45) Date of Patent: Sep. 14, 2004

(54) METHOD AND SYSTEM FOR MOTOR VELOCITY MEASUREMENT

(75) Inventors: Steven James Collier-Hallman, Frankenmuth, MI (US); William J Bressette, Midland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/116,284

(22) Filed: Apr. 4, 2002

(65) Prior Publication Data

US 2002/0149340 A1 Oct. 17, 2002

Related U.S. Application Data

(62) Division of application No. 09/661,657, filed on Sep. 14, 2000, now Pat. No. 6,498,409.
(60) Provisional application No. 60/154,279, filed on Sep. 16, 1999.

(51) Int. Cl.[7] .............................. G01P 3/00; H02P 5/00
(52) U.S. Cl. ...................... 310/68 B; 324/163; 702/145
(58) Field of Search ............. 701/41, 42; 324/160–161, 324/163–164; 702/145–147; 310/68 B

(56) References Cited

U.S. PATENT DOCUMENTS

| | | | |
|---|---|---|---|
| 3,731,533 A | 5/1973 | Geery .......................... | 324/163 |
| 4,008,378 A | 2/1977 | Nance et al. .............. | 179/15 A |
| 4,305,025 A | * 12/1981 | Arnold ........................ | 388/809 |
| 4,396,884 A | 8/1983 | Toalson .................. | 324/207.17 |
| 4,437,061 A | 3/1984 | Shinozaki et al. ............ | 322/94 |
| 4,512,367 A | * 4/1985 | Abe et al. .................... | 137/554 |
| 4,562,399 A | 12/1985 | Fisher ......................... | 322/95 |
| 4,710,683 A | 12/1987 | Bahn et al. .................. | 318/254 |
| RE32,857 E | 2/1989 | Luneau ......................... | 322/61 |
| 4,803,425 A | 2/1989 | Swanberg .................... | 324/173 |

(List continued on next page.)

FOREIGN PATENT DOCUMENTS

| | | | | |
|---|---|---|---|---|
| DE | 1 484 796 | 2/1975 | ........... | G01B/19/28 |
| JP | 358215560 A | 12/1983 | ........... | G01P/13/04 |
| JP | 8-211081 | 8/1996 | | |
| SU | 974273 A | 11/1982 | ............. | G01P/3/48 |
| WO | 99/61868 | 2/1999 | ............ | G01D/5/20 |

OTHER PUBLICATIONS

"Motor Tachometer Circuit" IBM Technical Disclosure Bulletin vol. 14, Issue No. 7, pp. 1986–1987; Dec. 1, 1971.*

(List continued on next page.)

*Primary Examiner*—Burton Mullins
(74) *Attorney, Agent, or Firm*—Michael D. Smith

(57) ABSTRACT

A method and system for determining the velocity of a rotating device is described herein. The system includes an apparatus with a set of sense magnets affixed to a rotating shaft of the rotating device and a circuit assembly. The circuit assembly includes a circuit interconnection having a plurality of sense coils and sensors affixed thereto. The circuit assembly is adapted be in proximity to the set of sense magnets on the rotating part. A controller is coupled to the circuit assembly, where the controller executes an adaptive algorithm that determines the velocity of the rotating device. The algorithm is a method of combining a derived velocity with a velocity from the tachometer. The algorithm includes a plurality of functions including: receiving a position signal related to the rotational position of the shaft; determining a derived velocity from the position signal; generating a plurality of tachometer velocity signals; determining a compensated velocity in response to the plurality tachometer velocity signals; and blending the compensated velocity with derived velocity to generate a blended velocity output.

64 Claims, 13 Drawing Sheets

U.S. PATENT DOCUMENTS

| | | | | |
|---|---|---|---|---|
| 4,836,319 | A | 6/1989 | Haseda et al. | 180/142 |
| 4,838,074 | A | 6/1989 | Morishita et al. | 73/118.1 |
| 4,853,604 | A | 8/1989 | McMullin et al. | 318/653 |
| 4,868,497 | A | 9/1989 | Wallrafen | 324/160 |
| 4,897,603 | A | 1/1990 | Bieber et al. | 324/307.2 |
| 4,901,015 | A | 2/1990 | Pospischil et al. | 324/207.17 |
| 4,922,197 | A | 5/1990 | Juds et al. | 324/207.21 |
| 4,924,161 | A | 5/1990 | Ueki et al. | 318/567 |
| 4,924,696 | A | 5/1990 | Schroeder et al. | 73/118.1 |
| 4,955,228 | A | 9/1990 | Hirose et al. | 73/118.1 |
| 4,961,017 | A | 10/1990 | Kakinoki et al. | 310/71 |
| 4,983,915 | A | 1/1991 | Rossi | 324/207.17 |
| 5,027,648 | A | 7/1991 | Filleau | 73/118.1 |
| 5,029,466 | A | 7/1991 | Nishihara et al. | 73/118.1 |
| 5,045,784 | A | 9/1991 | Pizzarello et al. | 324/163 |
| 5,062,064 | A * | 10/1991 | Sagues et al. | 702/147 |
| 5,088,319 | A | 2/1992 | Hirose et al. | 73/118.1 |
| 5,218,279 | A | 6/1993 | Takahashi et al. | 318/560 |
| 5,223,760 | A | 6/1993 | Peck et al. | 310/168 |
| 5,260,650 | A | 11/1993 | Schwesig et al. | 324/163 |
| 5,293,125 | A | 3/1994 | Griffen et al. | 324/173 |
| 5,298,841 | A | 3/1994 | Katayama et al. | 318/268 |
| 5,309,758 | A | 5/1994 | Kubota et al. | 73/118.1 |
| 5,329,195 | A | 7/1994 | Horber et al. | 310/68 B |
| 5,406,267 | A | 4/1995 | Curtis | 340/653 |
| 5,408,153 | A | 4/1995 | Imai et al. | 310/68 B |
| 5,422,570 | A | 6/1995 | Moreira | 324/177 |
| 5,498,072 | A | 3/1996 | Shimizu | 303/191 |
| 5,503,421 | A | 4/1996 | DeLisser et al. | 280/441.1 |
| 5,541,488 | A | 7/1996 | Bansal et al. | 318/801 |
| 5,717,268 | A | 2/1998 | Carrier et al. | 324/166 |
| 5,736,852 | A | 4/1998 | Pattantyus | 324/166 |
| 5,828,973 | A | 10/1998 | Takeuchi et al. | 701/41 |
| 5,902,342 | A | 5/1999 | Mishra | 701/22 |
| 6,002,234 | A | 12/1999 | Ohm et al. | 318/729 |
| 6,051,951 | A | 4/2000 | Arai et al. | 318/700 |
| 6,101,879 | A | 8/2000 | Shirai et al. | 73/514.39 |
| 6,155,106 | A | 12/2000 | Sano | 73/118.1 |
| 6,230,110 | B1 | 5/2001 | Iwazaki | 702/148 |
| 6,244,372 | B1 | 6/2001 | Sakamaki et al. | 180/442 |
| 6,244,373 | B1 * | 6/2001 | Kojo et al. | 180/443 |
| 6,246,197 | B1 | 6/2001 | Kurishige et al. | 318/432 |
| 6,250,417 | B1 | 6/2001 | Kaji et al. | 180/421 |
| 6,286,621 | B1 | 9/2001 | Mukai et al. | 180/446 |
| 6,310,458 | B1 * | 10/2001 | Fenstermacher | 318/603 |
| 6,470,994 | B1 * | 10/2002 | Shimizu et al. | 180/446 |
| 6,483,293 | B1 | 11/2002 | Chen et al. | 324/207.12 |
| 6,498,409 | B1 | 12/2002 | Collier-allman et al. | 310/68 B |
| 6,534,970 | B1 | 3/2003 | Ely et al. | 324/207.17 |

OTHER PUBLICATIONS

"Forms Motor Control System" IBM Technical Disclosure Bulletin vol. 21, Issue No. 4, pp. 1333–1334; Sep. 1, 1978.*

"DC Motor Acceleration Control" IBM Technical Disclosure Bulletin vol. 28, Issue No. 4, pp. 1561–1562; Sep. 1, 1985.*

Paul Horowitz & Winfield Hill, The Art of Electronics, Cambridge University Press, 1989, pp. 222–224.

PCT Written Opinion of International Application No.: PCT/US02/23719 Filed Jul. 26, 2002.

* cited by examiner

METHOD AND SYSTEM FOR MOTOR VELOCITY MEASUREMENT

CROSS REFERENCE TO RELATED APPLICATIONS

This application is a divisional of U.S. patent application Ser. No. 09/661,657, filed Sep. 14, 2000, now U.S. Pat. No. 6,498,409, the contents of which are incorporated herein by reference. This application claims the benefit of U.S. Provisional Application 60/154,279 filed Sep. 16, 1999, the contents of which are incorporated herein by reference.

TECHNICAL FIELD

The invention relates to a tachometer apparatus and methodology for determining the velocity of a motor as applied to a vehicle steering system.

BACKGROUND OF THE INVENTION

Speed sensors, or detectors of various types are well known in the art. In recent years the application of speed detection to motor control functions has stimulated demands on the sophistication of those sensors. Rotational speed sensors are commonly configured in the same manner as an electric machine, for example, a coil is placed in proximity to rotating magnets whereby the magnetic field induces a voltage on the passing coil in accordance with Faraday's Law. The rotating permanent magnets induce a voltage on the coil and ultimately a voltage whose frequency and magnitude are proportional to the rotational speed of the passing magnets.

Many of the tachometers that are currently available in the art exhibit a trade off between capabilities and cost. Those with sufficient resolution and accuracy are often very expensive and perhaps cost prohibitive for mass production applications. Those that are inexpensive enough to be considered for such applications are commonly inaccurate or provide insufficient resolution or bandwidth for the application.

Thus, there is a need, in the art for a low cost robust tachometer that provides sufficient accuracy and resolution for motor control applications and yet is inexpensive enough to be cost effective in mass production.

SUMMARY OF THE INVENTION

The above-identified drawbacks of the prior art are alleviated by the method described in the invention.

A method and apparatus for determining the velocity of a rotating device is described herein. The apparatus includes a set of sense magnets affixed to a rotating shaft of a rotating device and a circuit assembly, which interact to form an air core electric machine. The circuit assembly includes a circuit interconnection having a plurality of sense coils and sensors affixed thereto. The circuit assembly is adapted to be in proximity to the set of sense magnets on the rotating part.

A controller is coupled to the circuit assembly, where the controller is adapted to execute an adaptive algorithm that determines the velocity of the rotating device. The algorithm is a method of combining a derived velocity with a velocity from the tachometer. The algorithm includes a plurality of functions including: receiving a position signal related to the rotational position of the shaft; determining a derived velocity from the position signal; generating a plurality of tachometer velocity signals; determining a compensated velocity in response to the plurality tachometer velocity signals; and blending the compensated velocity with derived velocity to generate a blended velocity output.

BRIEF DESCRIPTION OF THE DRAWINGS

Referring now to the drawings wherein like elements are numbered alike in the several FIGURES.

DETAILED DESCRIPTION OF THE INVENTION

The present invention may be utilized in various types of motors and other rotational devices such as, for example, motors employed in a vehicle steering system. A preferred embodiment of the invention, by way of illustration is described herein as it may be applied to a motor tachometer in an electronic steering system. While a preferred embodiment is shown and described, it will be appreciated by those skilled in the art that the invention is not limited to the motor speed and rotation but also to any device where rotational motion and velocity are to be detected.

Figure 1:
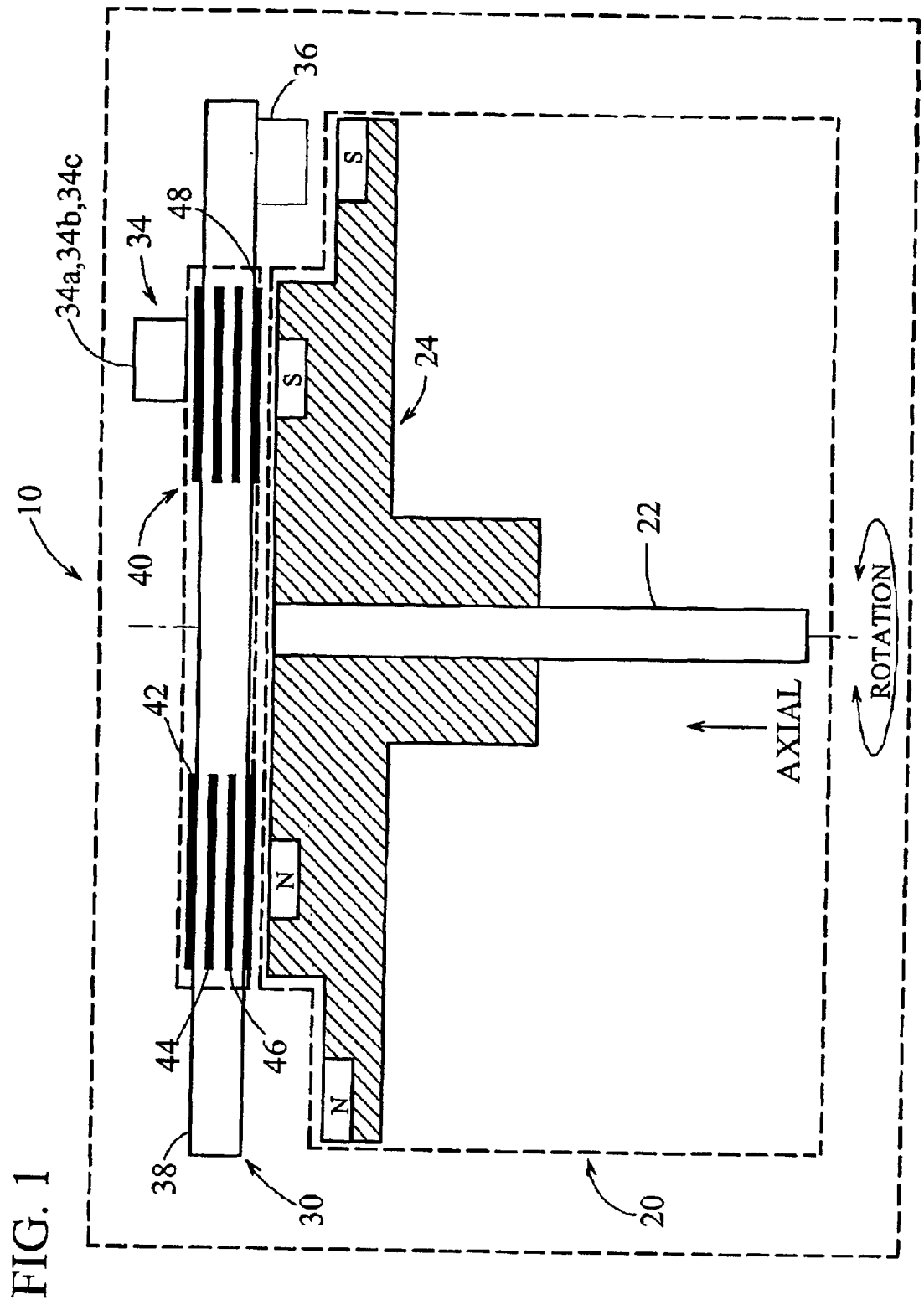
FIG. 1 depicts the cross-section of the fixed and rotating parts of a tachometer.
Figure 2:
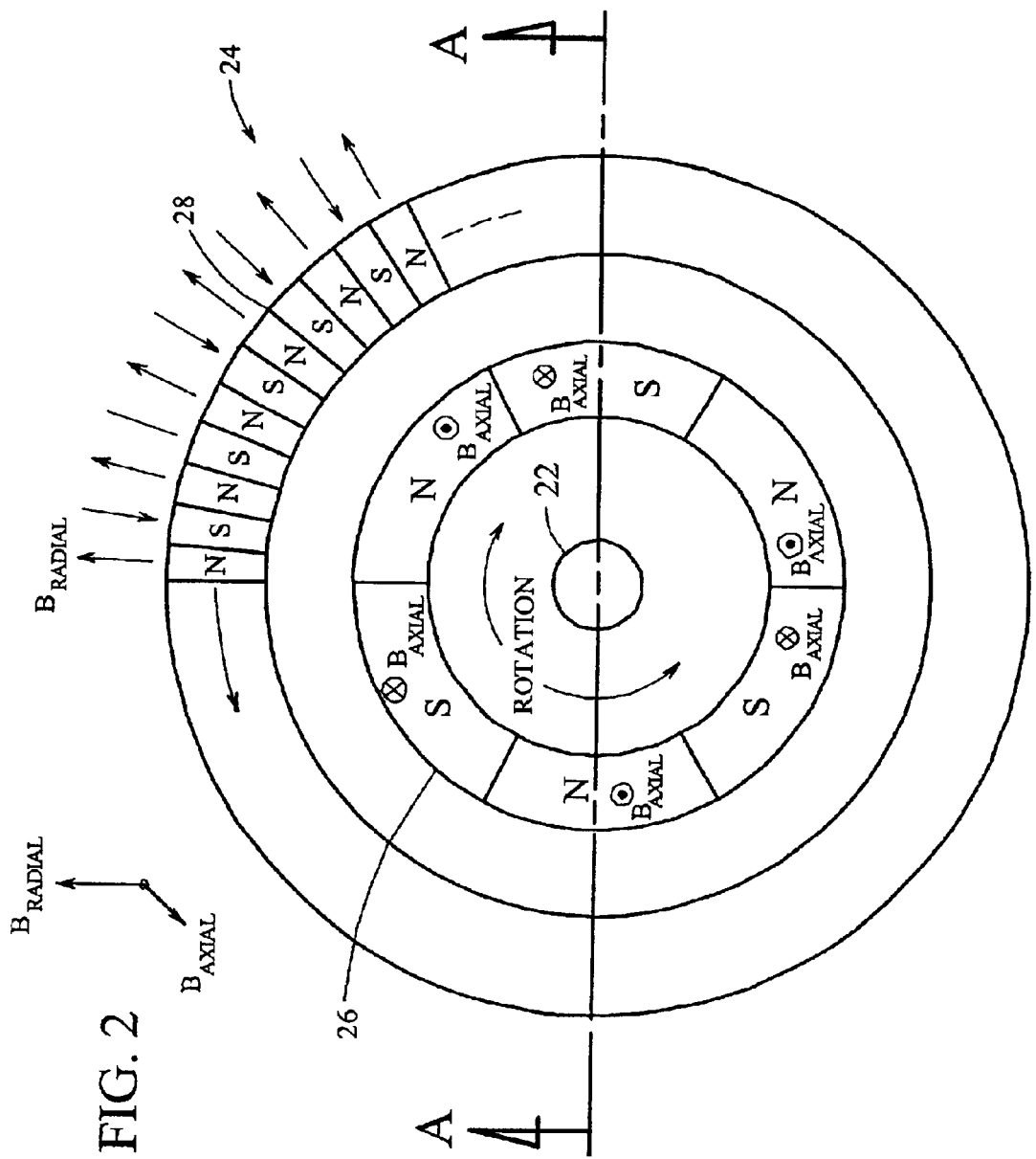
FIG. 2 depicts the sense magnet end-view illustrating the low and high-resolution poles.

A preferred embodiment of the invention provides a structure and method by which the rotational position and velocity of a motor are determined. Referring to FIG. 1, the invention employs a tachometer structure 10 comprised of rotational part 20 and a fixed circuit assembly 30. Where the rotational part, 20 includes a rotating shaft 22 and sense magnet 24. The rotating shaft 22 is connected to, or an element of the device, (not shown) whose rotational speed is to be determined. Referring to FIG. 2, an axial (end) view of the sense magnet 24 is depicted. The sense magnet 24 is attached to the rotating shaft 22 and arranged in two concentric, annular configurations, a first of smaller radius surrounded by the second of larger radius. The concentric, annular configurations may be coplanar. The low-resolution magnet 26 comprising the inner annulus of sense magnet 24 is constructed as a six-pole permanent magnet. While the preferred embodiment utilizes the stated configuration, other configurations are reasonable. The magnet structure need only be sufficient to allow adequate detection in light of the sensing elements utilized, processing employed, and operational constraints. The high-resolution magnet 28 comprising the outer annulus of sense magnet 24 is configured as a 72-pole permanent magnet 28. Again, the magnet structure need only be sufficient to allow adequate detection in light of the sensing elements, processing employed, and operational constraints. Each of the magnets 26 and 28 is comprised of alternating north and south poles equally distributed around each respective annulus. One skilled in the art would appreciate that the magnets when rotated generate an alternating magnetic field which when passed in proximity to a conductor (coil) induce a voltage on the conductor. Further, using well-understood principles the magnitude of the voltage induced is proportional to the velocity of the passing magnetic field, the spacing and orientation of the coil from the magnets.

Figure 3:
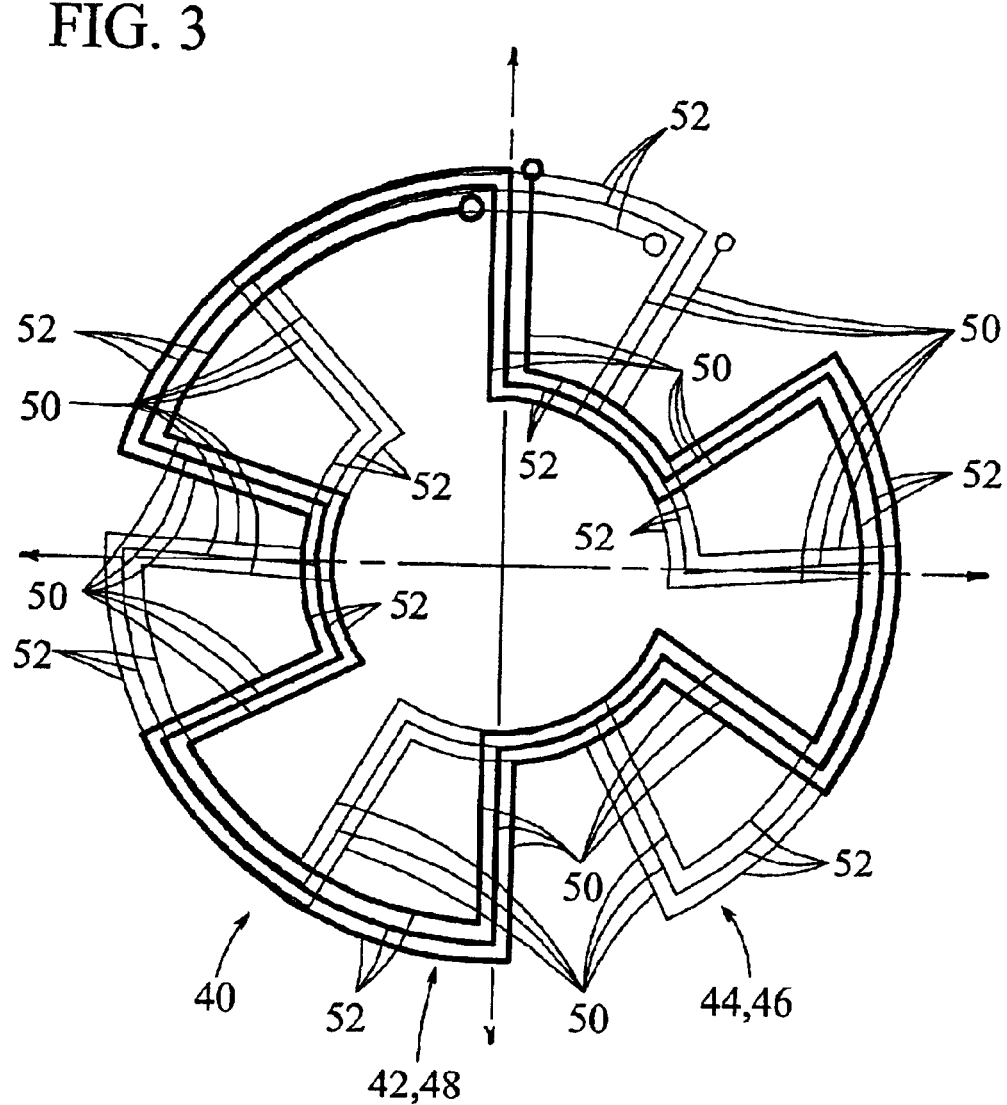
FIG. 3 depicts a partial view of a tachometer coil arrangement in the circuit interconnection.

FIGS. 1 and 3 depict the circuit assembly 30. The circuit assembly 30 includes; a plurality of tachometer coils 40, low-resolution Hall sensor set 34, and high-resolution position sensor 36. The circuit assembly 30 is placed parallel to and in close proximity to the axial end of the rotating sense magnet 24. A circuit interconnection 38 provides electrical interconnection of the circuit assembly 30 components and may be characterized by various technologies such as hand wiring, a printed card, flexible circuit, lead frame, ceramic substrate, or other circuit connection fabrication or methodology. A preferred embodiment for the circuit assembly 30 comprises the abovementioned elements affixed to a printed circuit board circuit interconnection 38 of multiple layers.

Referring to FIGS. 1 and 3, the tachometer coils 40 are located on the circuit assembly 30 in such an orientation as to be concentric with the sense magnet 24 in close proximity to the inner annulus low resolution poles 26. In a preferred embodiment of the invention, the conductive tachometer coils 40 are an integral part of the circuit interconnection 38. The tachometer coils 40 include two or more spiraling conductor coils 42–48 concentrically wound in a serpentine fashion such that each conductor comprises a twelve turn winding on each of two layers. Coil A is comprised of windings 42 and 48 and coil B is comprised of windings 46 and 44. Each of the windings is configured such that it spirals inward toward the center on one layer and outward from the center on the second layer. Thereby, the effects of the windings' physical construction variances on the induced voltages are minimized. Further, the tachometers coils 40 are physically arranged such that each has an equivalent effective depth on the circuit assembly 30. That is, the windings are stacked within the circuit assembly 30 such that the average axial distance from the magnets is maintained constant. For example, the first layer of coil A, winding 42 could be the most distant from the magnets, and the second layer of coil A, winding 48 the closest to the magnets, while the two layers of coil B 46 and 44 could be sandwiched between the two layered windings of coil A. The exact configuration of the coil and winding arrangement stated is illustrative only, many configurations are possible and within the scope of the invention. The key operative function is to minimize the effects of multiple winding effective distances (gaps) on the induced voltages. While two twelve turn windings are described, the coil configuration need only be sufficient to allow adequate detection in light of the magnetic field strength, processing employed, physical and operational constraints.

FIG. 3 depicts a partial view of a preferred embodiment. Three turns of the first layer of coil A, winding 42 are shown. Each winding is comprised of six active 50 and six inactive 52 segments per turn. The active segments 50 are oriented approximately on radials from the center of the spiral while the inactive segments 52 are orientated as arcs of constant radius. The active segments 50 are strategically positioned equidistant about the circumference of the spiral and directly cutting the flux lines of the field generated by the low resolution magnet 26. The inactive segments 52 are positioned at equal radial distances and are strategically placed to be outside the magnetic flux lines from the low resolution magnet 26. One skilled in the art will appreciate that the winding is uniquely configured as described to provide maximum voltage generation with each passing pole of the low-resolution magnet 26 in the active segments 50 and minimal or no voltage generation with each passing pole of the low resolution magnet 26 in the inactive segments 52. This results in predictable voltage outputs on the tachometer coils 40 for each rotation of the low-resolution magnet 26. A preferred embodiment employs two coils, on two layers each with 144 active and 144 inactive segments. However, it will be understood that only the quantity of active segments 50 not the inactive segments 52 is relevant. Any number of inactive segments 52 is feasible, only dictated by the physical constraints of interconnecting the active segments 50.

Figure 4:
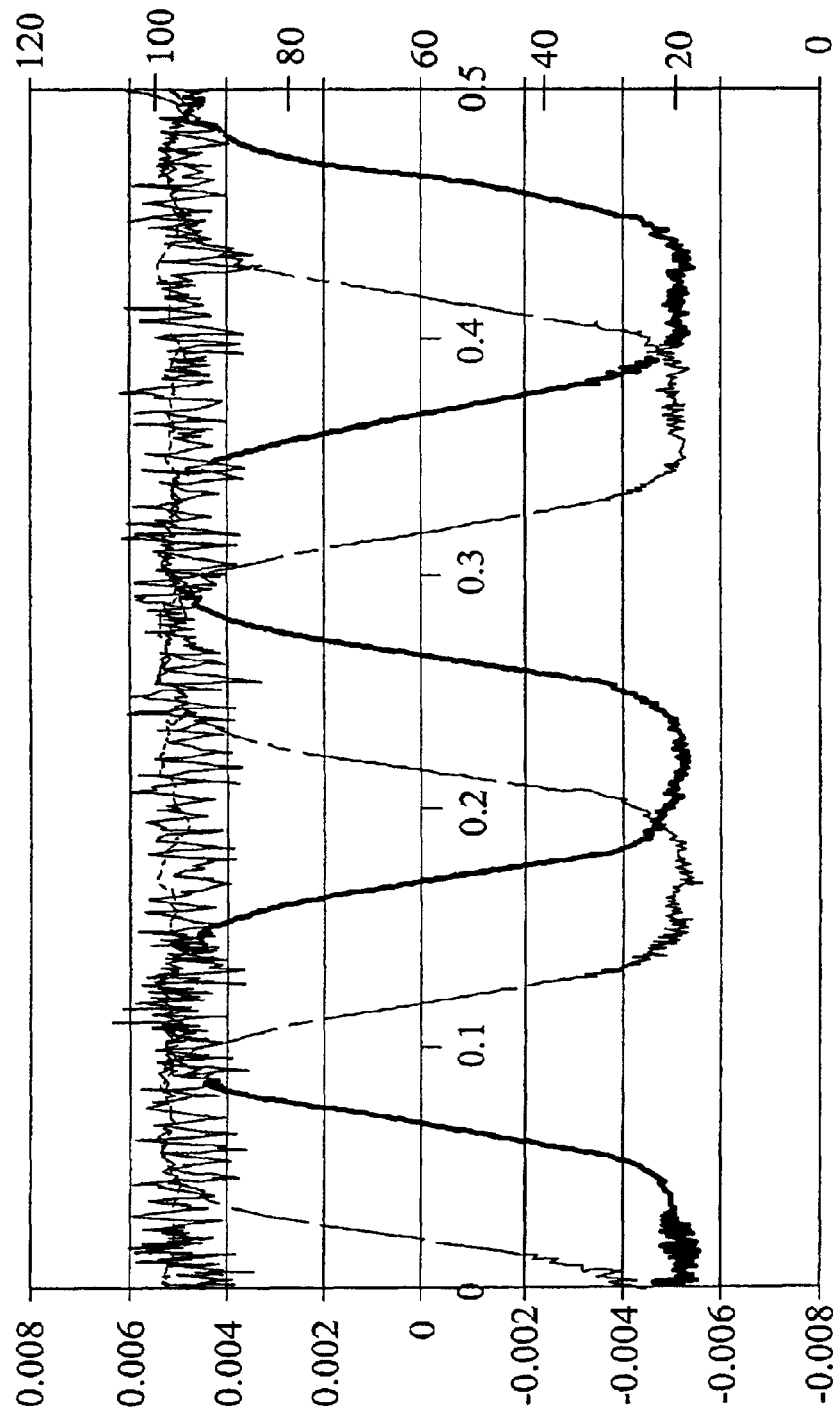
FIG. 4 depict the expected output waveform from the low-resolution tachometer coils.
Figure 6:
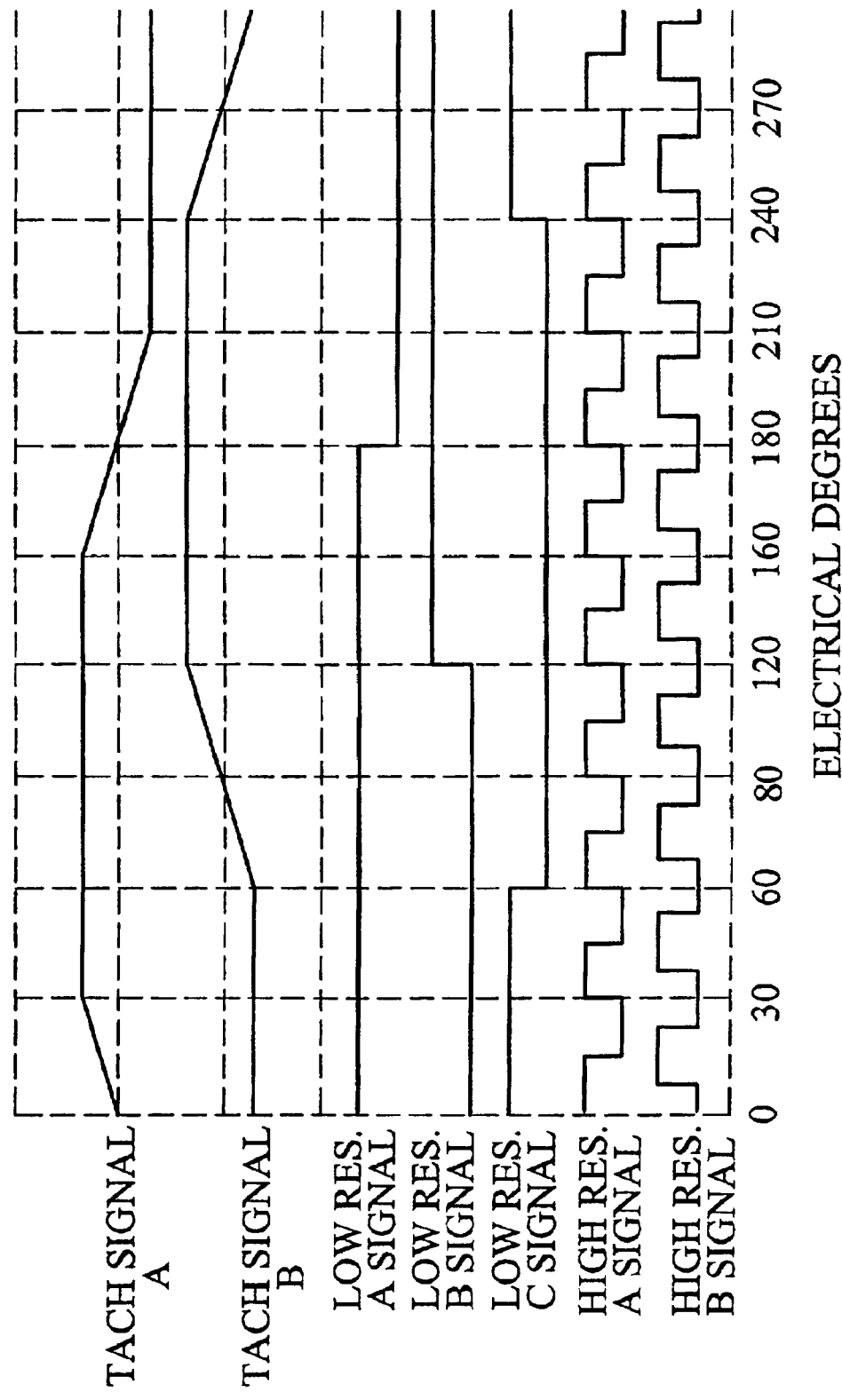
FIG. 6 depict the expected output waveform from the high-resolution position sensor.

Additionally, the tachometer coils 40 are comprised of two (or more) complete spiral serpentine windings 42–48, 46–44. The windings 42–48 and 46–44 may be oriented relative to one another in such a way that the voltages generated by the two coils would possess differing phase relationships. Further, that the orientation may be configured in such a way as to cause the generated voltages to be in quadrature. In a preferred embodiment where the low-resolution poles are comprised of six magnets of sixty degree segments, the two coils are rotated concentrically relative to one another by thirty degrees. This rotation results in a phase difference of 90 degrees between the two generated voltages generated on each coil. In an exemplary embodiment, the two generated voltages are ideally configured such that the voltage amplitude is discernable for all positions and velocities. In an exemplary embodiment, the two generated voltages are trapezoidal. FIGS. 4 and 6 depicts the output voltage generated on the two coils as a function of rotation angle of the rotating shaft 22 for a given speed.

Figure 5:
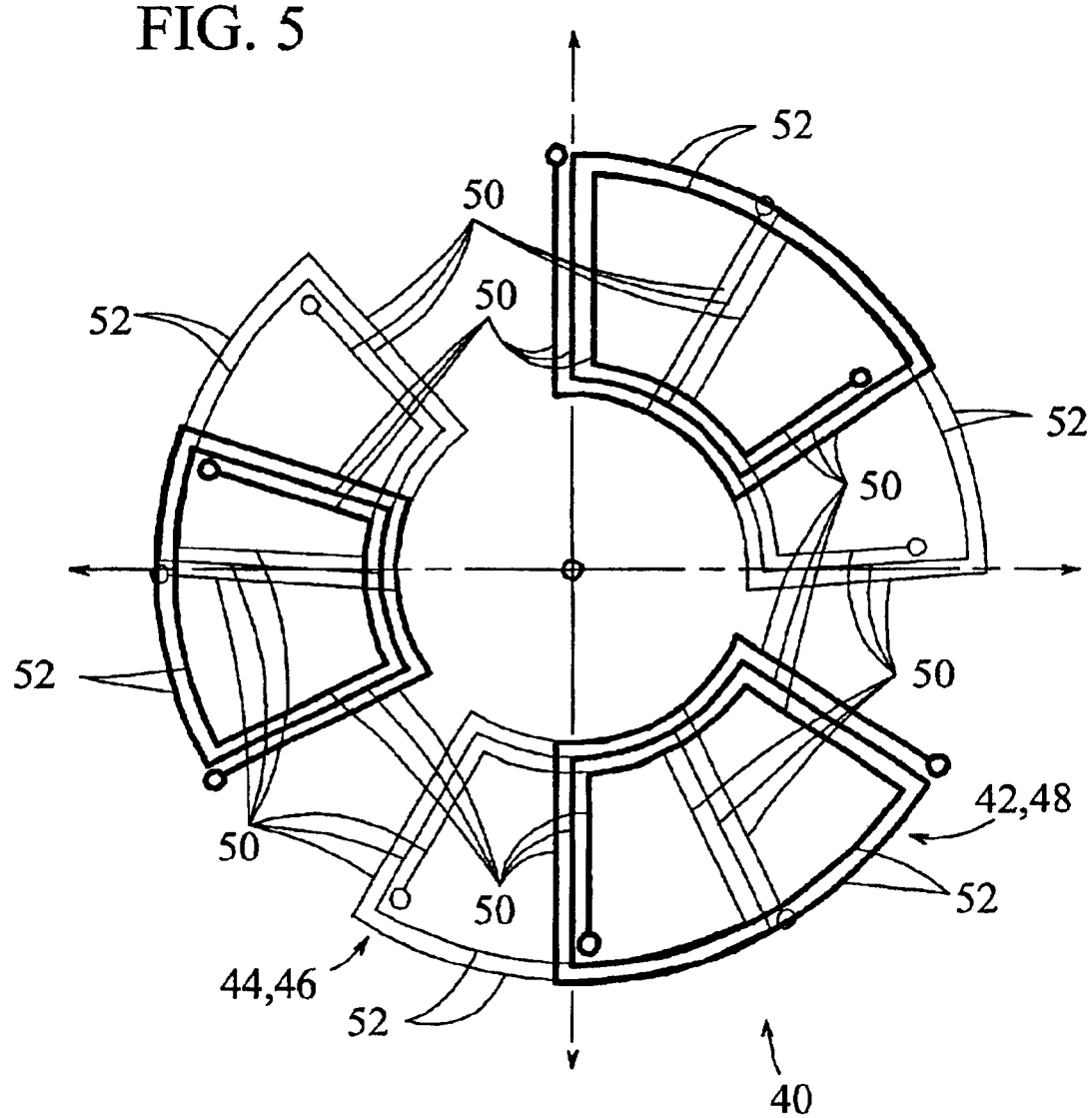
FIG. 5 depicts a partial view of an alternative embodiment of the tachometer coil arrangement in the circuit interconnection board.

In another embodiment of the invention, the windings may be individually serpentine but not necessarily concentric. Again, the coil configuration need only be sufficient to allow adequate detection in light of the magnetic field strength, processing employed, physical and operational constraints. One skilled in the art would recognize that the coil could be comprised of many other configurations of windings. FIG. 5 depicts one such a possible embodiment of the invention.

Referring again to FIG. 1, in a preferred embodiment, the Hall sensor set 34 is located on the circuit assembly 30 in an orientation concentric with the tachometer coils 40 and concentric with the rotating part 20. Additionally, the Hall sensor set is placed at the same radius as the active segments 50 of the tachometer coils 40 to be directly in line axially with the low-resolution poles 26 of the sense magnet 24. The Hall sensor set 34 is comprised of multiple sensors equidistantly separated along an arc length where two such sensors are spaced equidistant from the sensor between them. In a preferred embodiment, the Hall sensor set 34 is comprised of three Hall effect sensors, 34a, 34b, and 34c, separated by 40 degrees and oriented along the described circumference relative to a predetermined reference position so that absolute rotational position of the rotating part 20 may be determined. Further, the Hall sensor set 34 is positioned to insure that the active segments 50 of the tachometer coils 40 do not interfere with any of the Hall sensors 34a, 34b, and 34c or vice versa. It is also noteworthy to consider that in FIG. 1, the Hall sensor set 34 is depicted on the distant side of the circuit assembly 30 relative to the low-resolution magnet 26. This configuration addresses the trade between placing the Hall sensor set 34 or the tachometer coils 40 closest to the low-resolution magnet 26. In a preferred embodiment, such a configuration is selected because the signals from the Hall sensor set 34 are more readily compensated for the additional displacement when compared to the voltages generated on the tachometer coils 40. It will be appreciated by those skilled in the art that numerous variations on the described arrangement may be contemplated and within the scope of this invention. The Hall sensor set 34 detects the passing of the low-resolution magnet 26 and provides a signal voltage corresponding to the passing of each pole. This position sensing provides a signal accurately defining the absolute position of the rotational part 20. Again, in the preferred embodiment, the three signals generated by the Hall sensor set 34 with the six-pole low-resolution magnet facilitate processing by ensuring that certain states of the three signals are never possible. One skilled in the art will appreciate that such a configuration facilitates error and failure detection and ensures that the trio of signals always represents a deterministic solution for all possible rotational positions.

The position sensor 36 is located on the circuit assembly 30 in such an orientation as to be directly in line, axially with the magnets of the outer annulus of the sense magnet 24, yet outside the effect of the field of the low-resolution magnet 26. The position sensor 36 detects the passing of the high-resolution magnet 28 and provides a signal voltage corresponding to the passing of each pole. To facilitate detection at all instances and enhance detectability, the position sensor 36 includes two Hall effect sensors in a single package separated by a distance equivalent to one half the width of the poles on the high-resolution magnet 28. Thus, with such a configuration the position signals generated by the position sensor 36 are in quadrature. One skilled in the art will appreciate that the quadrature signal facilitates processing by ensuring that one of the two signals is always deterministic for all possible positions. Further, such a signal configuration allows secondary processing to assess signal validity. FIG. 6 depicts the output voltage as a function of rotational angle of the position sensor 36 for a given speed. It is noteworthy to point out that the processing of the high-resolution position allows only a relative determination of rotational position. It is however, acting in conjunction with the information provided by the low-resolution position signals from the Hall sensor set 34 that a determination of the absolute position of the rotating part 20 is achieved. Other applications of the low-resolution position sensor are possible.

In another embodiment of the invention, the structure described above is constructed in such a fashion that the active segments of the tachometer coils 40 are at a radial proximity to the sense magnets instead of axial. In such an embodiment, the prior description is applicable except the rotational part 20 would include magnets that are coaxial but not coplanar and are oriented such that their magnetic fields radiate in the radial direction rather than the axial direction. Further, the circuit assembly 30 may be formed cylindrically rather than planar and coaxial with the rotational part 20. Finally, the tachometer coils 40, Hall sensor set 34, and position sensor 36, would again be oriented such that the active segments 50 would be oriented in the axial direction in order to detect the passing magnetic field of the low-resolution magnet 26.

Figure 7:
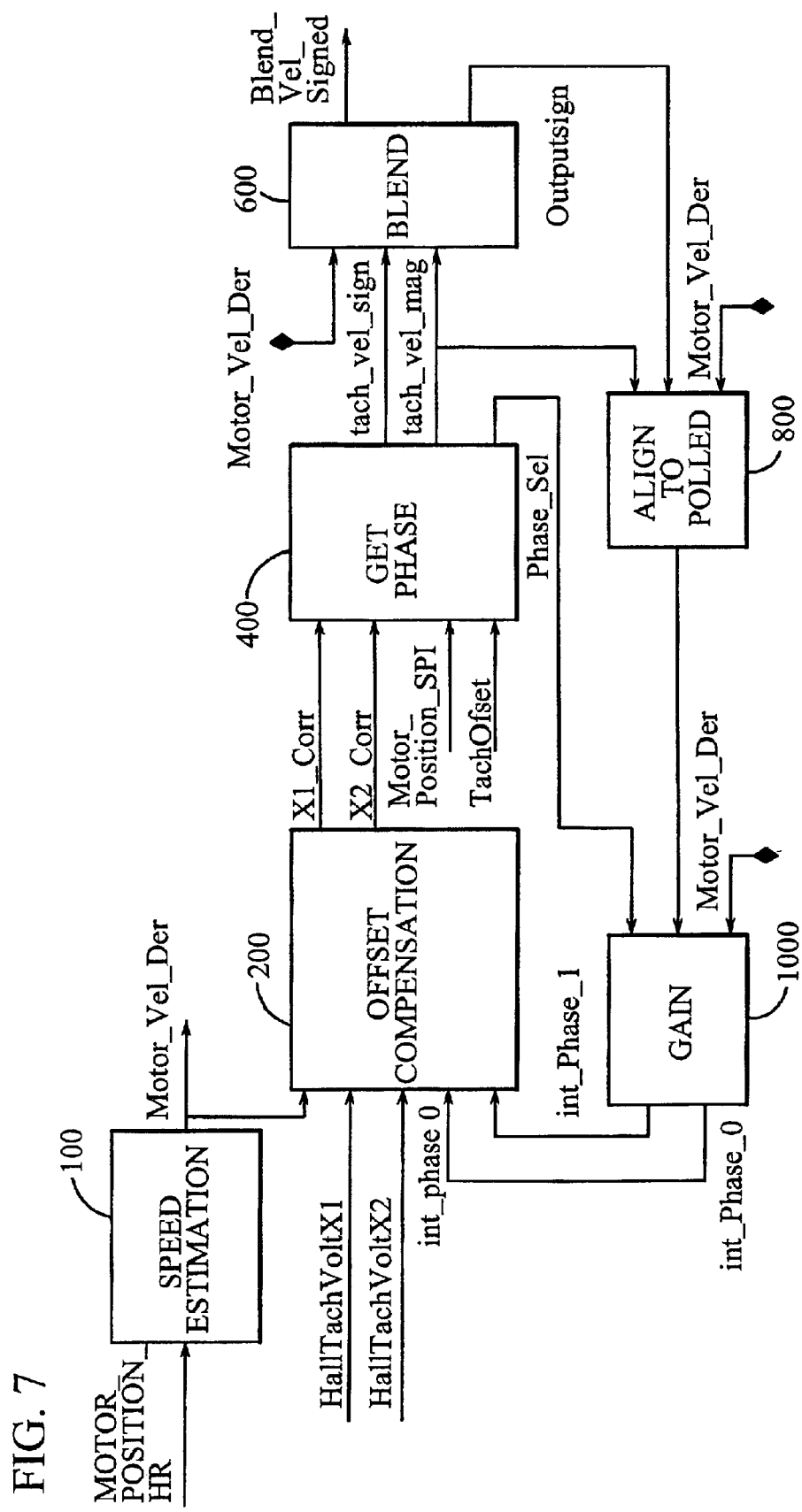
FIG. 7 depicts a top-level functional block diagram of a method for determination of the rotational speed.

FIG. 7 depicts the top-level block diagram of the processing functions employed on the various signals sensed to determine the rotational speed of a rotating device. The processing defined would be typical of what may be performed in a controller. Such a controller may include, without limitation, a processor, logic, memory, storage, registers, timing, interrupts, and the input/output signal interfaces as required to perform the processing prescribed by the invention. Referring again to FIG. 7, where the blocks 100–1000 depict the adaptive algorithm executed by the abovementioned controller in order to generate the tachometer output. The first four blocks 100, 200, 400, 600 perform the "forward" processing of the tachometer coil signals to arrive at the final blended output. While, the last two 800, 1000 comprise a "feedback" path thereby constructing the adaptive nature of the algorithm.

In FIG. 7, the function labeled Speed Estimation 100 generates a digital, derived velocity signal. The process utilizes Motor_Position_HR the high-resolution position sensed by 36, and a processor clock signal for timing. The process outputs a signal Motor_Vel_Der_144 which is proportional to the velocity of the motor over the sample period of the controller. Continuing to Offset Compensation 200 where processing is performed to generate filtered tachometer signals to remove offsets and bias. The process utilizes the two tachometer coil signals HallTachVoltX1, HallTachVoltX2, the derived velocity Motor_Vel_Der_144 and two phase related feedback signals int_Phase0 and int_Phase1 as inputs and generates compensated velocity outputs X1_Corr and X2_Corr. Continuing to Get Phase 400 where processing is performed to ascertain magnitude and phase relationships of the two compensated velocities. Inputs processed include the compensated velocities X1_Corr, X2_Corr, and the motor position Motor_Position_SPI as derived from the high-resolution position detected by sensor 36. The process generates two primary outputs, the selected tachometer magnitude $tach_{13}$ vel_mag and the selected tachometer phase tach_vel_sign. Moving to the Blend 600 process where predetermined algorithms determine a blended velocity output. The process utilizes the selected tachometer magnitude tach_vel_mag and the selected tachometer phase $tach\_vel_{13}$ sign to generate two outputs; the blended velocity Blend_Vel_Signed and the velocity sign OutputSign. Considering now the AlignTo-Polled 800 process wherein the tachometer magnitude tach_vel_mag is time shifted based upon the magnitude of the derived velocity Motor_Vel_Der_144. The selected signal is filtered and supplied as an output as Filtered_Tach. Finally, looking to Gain 1000 where the process generates an error command resultant from the difference between the derived velocity and filtered tachometer under predetermined conditions. The error signal is integrated and utilized as an error command signal for gain adjustment feedback The process utilizes the derived velocity Motor_Vel_Der_144 and the Filtered_Tach signal as inputs to generate two outputs int_Phase0 and int_Phase1. These two signals form the gain adjustment feedback that is then utilized as an input in the abovementioned Offset Compensation 200.

Figure 8:
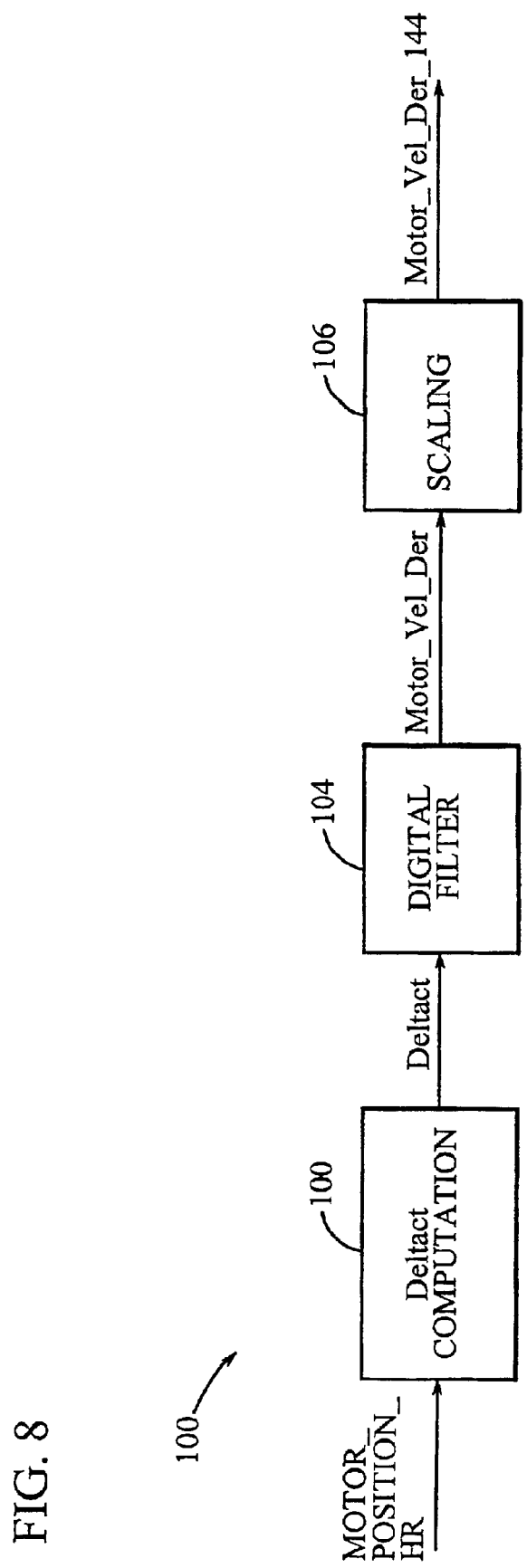
FIG. 8 depicts the Speed Estimation process.

Referring now to FIG. 7 and FIG. 8 for a more detailed description of the functional operation of each of the processes identified above. FIG. 8 depicts the functions that comprise the Speed Estimation 100 process block. This process is a method of extracting a digital, derived velocity based on the per sample period of change of the position signal. The process utilizes as an input Motor_Position_HR the high-resolution position detected by sensor 36, and outputs a signal Motor_Vel_Der _144, which is proportional to the derived velocity of the motor. The process computes the velocity by employing two main functions. The first is the Deltact calculation process 102 where a position change DELTA_POSITION is computed by subtracting the high-resolution position Motor_Position_HR delayed by one sample from the current high-resolution position Motor_Position_HR. That is, subtracting the last position from the current position. The position difference is then divided by the difference in time between the two samples. An equation illustrating the computation is as follows:

$$Deltact = \frac{P_0 - P_{-1}}{T_0 - T_{-1}}$$

A preferred embodiment of the above equation evaluates a changing measured position over a fixed interval of time to perform the computation. It will be appreciated by those skilled in the art, that the computation may be performed with several variations. An alternative embodiment, evaluates a changing measured time interval for a fixed position change to perform the computation. Further, in yet another embodiment, both the interval of time and interval position could be measured and compared with neither of the parameters occurring at a fixed interval.

A filter 104 further processes the calculated Deltact value. Where the filtering characteristics are selected and determined such that the filter yields a response sufficiently representative of the true velocity of the motor without adding excessive delay. One skilled in the art will appreciate and understand that there can be numerous combinations, configurations, and topologies of filters that can satisfy such requirements. A preferred embodiment employed a four-state moving average filter. The signal is labeled Motor_Vel_Der, which is then scaled at gain 106 and output from the process as the value labeled Motor_Vel_Der_144. This parameter is utilized throughout the invention as a highly accurate representation of the velocity.

Figure 9:
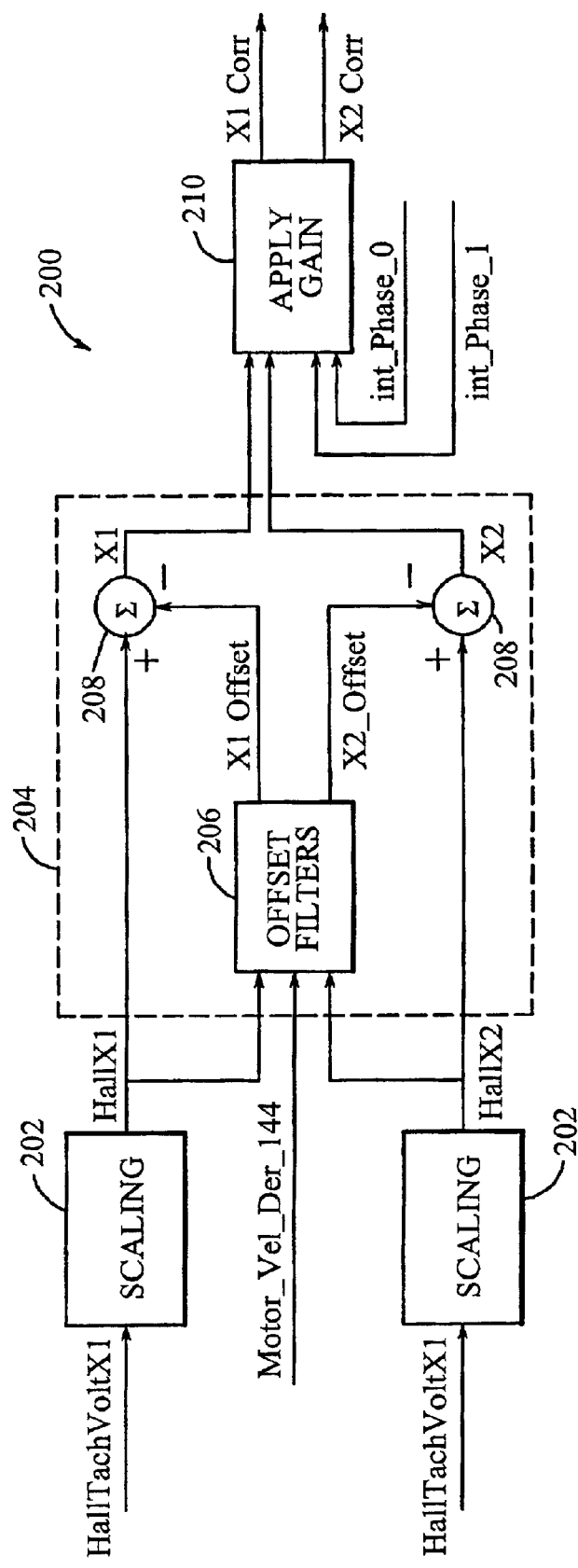
FIG. 9 depicts the Offset Compensation process.

FIG. 9 depicts the functions that comprise the Offset Compensation process 200. The process extracts the respective offset and bias from each of the two tachometer coil signals HallTachVoltX1 and HallTachVoltX2 resulting in compensated velocity outputs X1_Corr and X2_Corr. The extraction is accomplished by an algorithm that under predetermined conditions subtracts from each of the tachometer signals its low frequency spectral components. The algorithm is characterized by scaling 202; a selective, adaptive, filter 204; and a gain schedule/modulator Apply Gain 210. Where, the scaling 202 provides gain and signal level shifting resultant from the embodiment with an analog to digital conversion; the adaptive filter 204 comprises dual selective low pass filters 206 and summers 208 enabled only when the tachometer signals' levels are valid; and gain scheduling, which is responsive to feedback signals int_Phase0 and int_Phase1 from the Gain process 1000.

The adaptive filter 204 is characterized by conditionally enabled low pass filters 206, and summers 208. The low pass filters 206 under established conditions, are activated and deactivated. When activated, the filter's 206 results are the low frequency spectral content of the tachometer signals to a predetermined bandwidth. When deactivated, the filter 206 yields the last known filter value of the low frequency spectral content of the tachometer signals. It is important to consider that the filter 206 is activated when the tachometer signals are valid and deactivated when they are not. In a preferred embodiment, this occurs when the tachometer signals saturate at a high velocity. Various conditions may dictate the validity of the tachometer signals. In a preferred embodiment, within certain hardware constraints, to satisfy low speed resolution and bandwidth requirements, high speed sensing capability with the tachometer signals is purposefully ignored. This results in the tachometer signals saturating under high speed operating conditions. As such, it is desirable to deactivate the filters 206 under such a condition to avoid filtering erroneous information. A summer 208 subtracts the low pass filter 206 outputs to the original tachometer signals thereby yielding compensated tachometer signals with the steady state components eliminated. The filter 206 characteristics are established to ensure that the filter response when added to the original signals sufficiently attenuates the offsets and biases in the tachometer signals. One skilled in the art will appreciate that there can be numerous combinations, configurations, and topologies of filters that can satisfy such requirements. A preferred embodiment employs an integrating loop low pass filter.

The gain scheduling function Apply Gain 210 is responsive to feedback signals int_Phase0 and int_Phase1 from the Gain process 1000 (discussed below). The Apply Gain 210 process scales the compensated velocity outputs X1_Corr and X2_Corr as a function of the feedback signals int_Phase0 and int_Phase1. Thereby providing a feedback controlled correction of the velocity signal for accuracy and speed correction.

Figure 10:
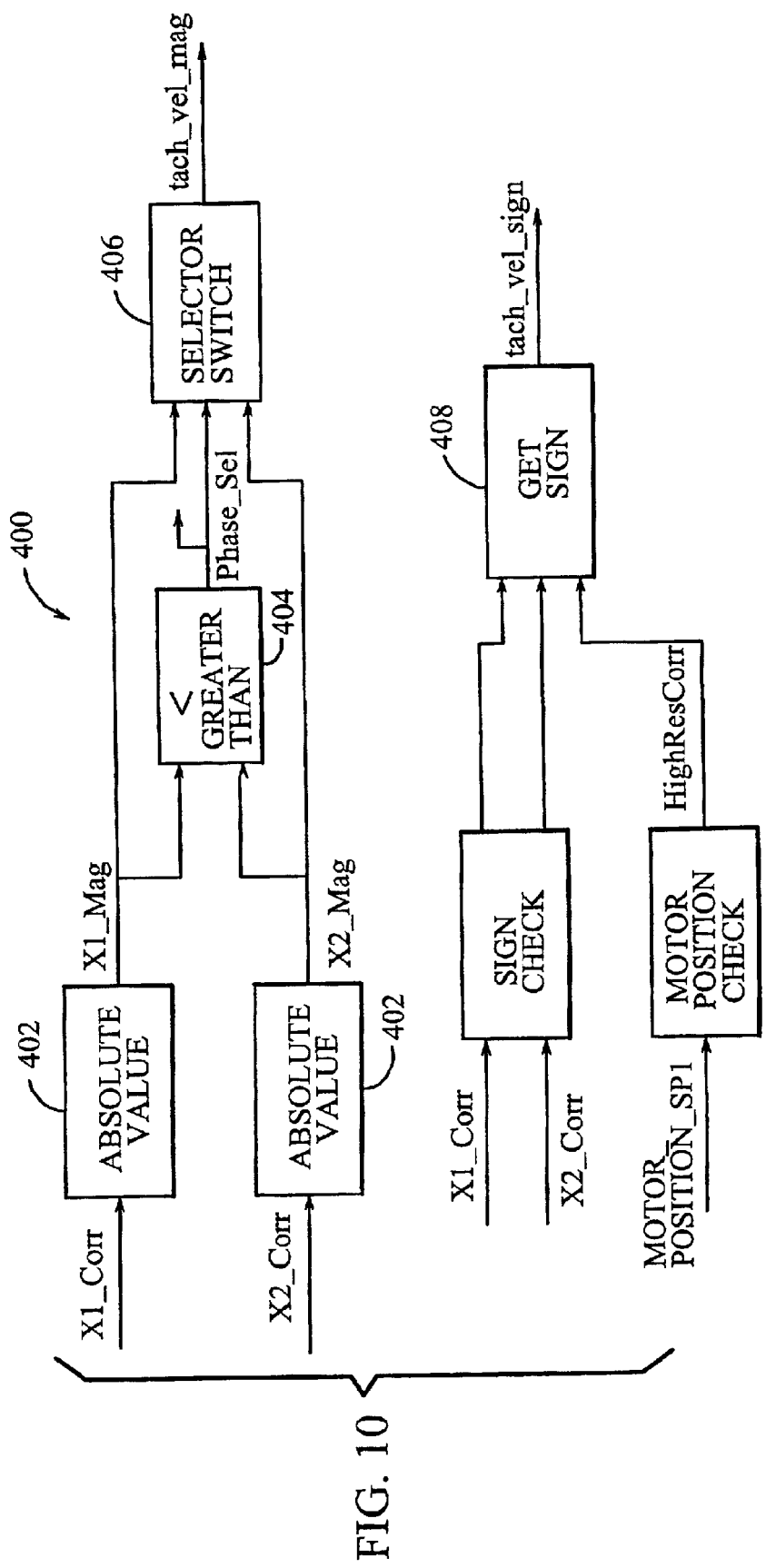
FIG. 10 depicts the Get Phase process.

FIG. 10 depicts the internal process of Get Phase 400 where processing is performed to ascertain magnitude and phase relationships of the two compensated velocities. Inputs processed include the offset compensated velocities X1_Corr, X2_Corr, the motor position $Motor_{13}$ Position_SPI, and a calibration adjustment signal TachOffset. The motor position signal Motor_Position_SPI derived from the high-resolution position as detected by sensor 36 and indexed to the absolute position as described earlier. The TachOffset input allows for an initial fabrication based adjustment to address differences or variations in the orientation of the tachometer coils 40 (FIGS. 1 and 3) and the low-resolution Hall sensor set 34 (FIG. 1). The process generates two primary outputs, the selected tachometer magnitude tach_vel_mag and the selected tachometer phase tach_vel_sign. The process independently determines which tachometer signal magnitude and phase to select by making a comparison with the high-resolution position Motor_Position_SPI. The process determines the magnitude of the two velocities X1_Corr and X2_Corr at 402. Then at comparator 404 determines the larger of the two and then generates a discrete, Phase_Sel, indicative of which velocity has the larger magnitude. The larger magnitude velocity is selected because by the nature of the two trapezoidal signals, one is guaranteed to be at its maximum. The discrete Phase_Sel controls a switch 406, which in turn passes the selected tachometer velocity magnitude termed tach_vel_mag. The discrete Phase_Sel is also utilized in later processes. A second and separate comparison at 408 with the high-resolution position Motor_Position_SPI extracts the respective sign associated with the velocity. Again, it will be understood that those skilled in the art may conceive of variations and modifications to the preferred embodiment shown above. For example, one skilled in the art would recognize that the phase information could have also been acquired merely by utilizing the position information alone. Such an approach however, suffers in that it would be highly sensitive to the precise positioning and timing on the trapezoidal waveforms to insure an accurate measurement. Such a restriction is avoided in the preferred embodiment, thereby simplifying the processing necessary.

Figure 11:
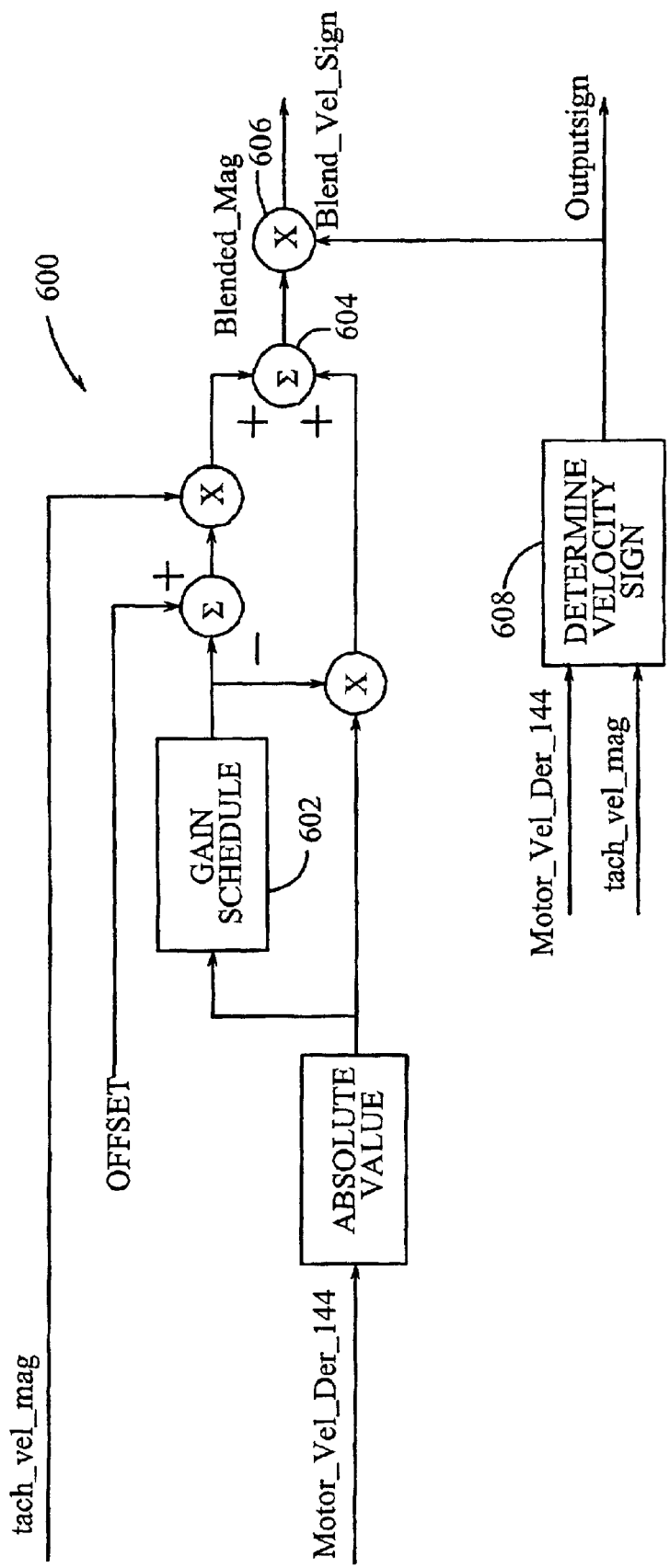
FIG. 11 depicts the Blend process.

FIG. 11 depicts the Blend 600 process function where predetermined algorithms determine a blended velocity output. The process utilizes the selected tachometer magnitude tach_vel_mag, the derived velocity Motor_Vel Der_144 and the selected tachometer phase tach_vel_sign to generate two outputs; the blended velocity Blend_Vel_Signed and the velocity sign OutputSign. A blended velocity solution is utilized to avoid the potential undesirable effects of transients resultant from rapid transitions between the derived velocity and the tachometer-measured velocity. The process selects based upon the magnitude of the derived velocity Motor_Vel_Der_144 a level of scheduling at gain scheduler 602 of the derived velocity with the compensated, measured, and selected velocity, tach_vel_mag. Summer 604 adds the scheduled velocities, which are then multiplied at 606 by the appropriate sign as determined from the tachometer phase tach_vel_sign to generate the blended composite signal. The blended composite signal comprises a combination of the tachometer measured velocity and the derived velocity yet without the negative effects of saturation or excessive time delays.

Figure 12:
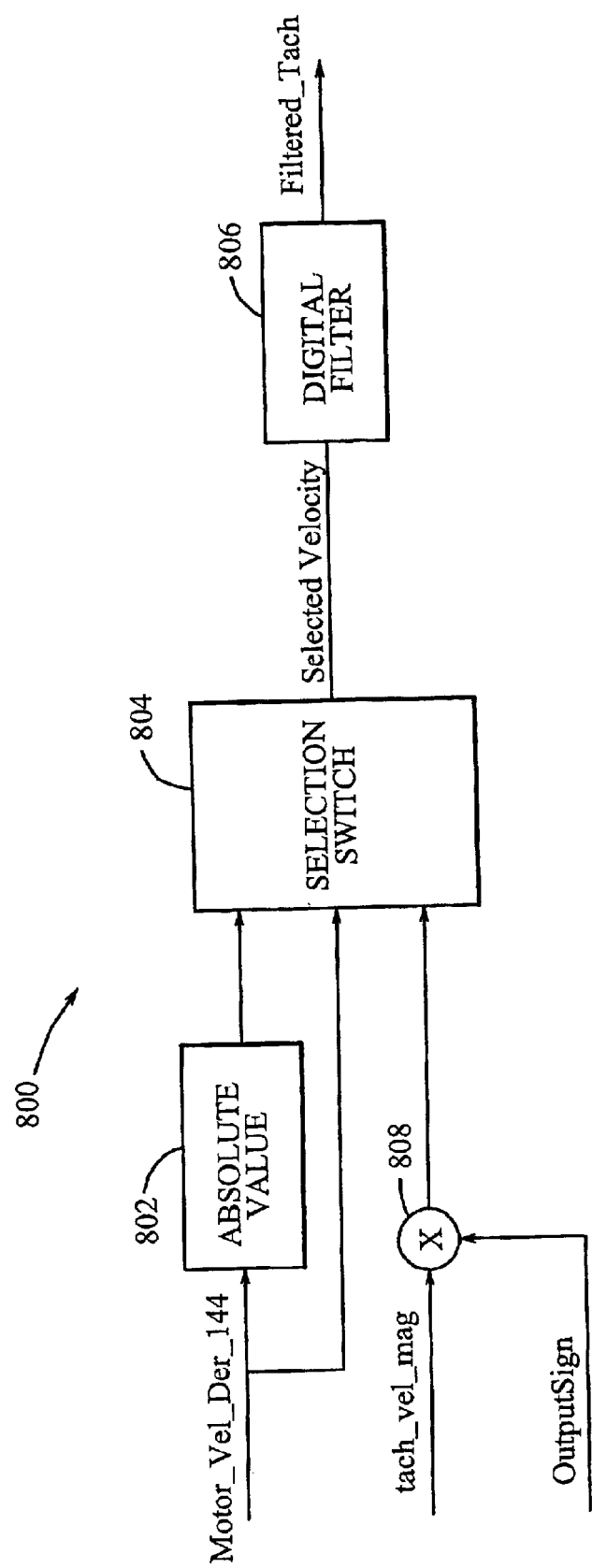
FIG. 12 depicts the AlignToPolled process.

FIG. 12 depicts the AlignToPolled 800 process, which time shifts (delays) the tachometer magnitude tach_vel_mag to facilitate a coherent comparison with the derived velocity Motor_Vel_Der_144. The filtering is only employed when the tachometer magnitude tach_vel_mag is within a valid range as determined in processes 802 and 804. The valid range is determined based upon the magnitude of the derived velocity Motor_Vel_Der_144. As stated earlier, the validity of the tachometer signals is related to high speed saturation, while for the derived velocity it is a function of filtering latency at very low speed. A selection switch 804 responsive to the magnitude of the derived velocity Motor_Vel_Der_144 controls the application of the tach_vel_mag signal to the filter. The multiplication at 808 applies the appropriate sign to the tach_vel_mag signal. A filter 806 is employed to facilitate generation of the time delay. The appropriate time delay is determined based upon the total time delay that the derived velocity signals experience relative to the tachometer signals. The time shift accounts for the various signal and filtering effects on the analog signals and the larger time delay associated with filtering the derived velocity signal. As stated earlier, the derived velocity signal experiences a significant filtering lag, especially at lower speeds. Introducing this shift yields a result that makes the tachometer signals readily comparable to the derived velocity. The selected signal is delivered as an output as Filtered_Tach.

In a preferred embodiment, the resultant filter 806 is a four state moving average filter similar to the filter 104 (FIG. 8) implemented in the Speed Estimation process. One skilled in the art will recognize that there can be numerous combinations, configurations, and topologies of filters that can satisfy such requirements.

Figure 13:
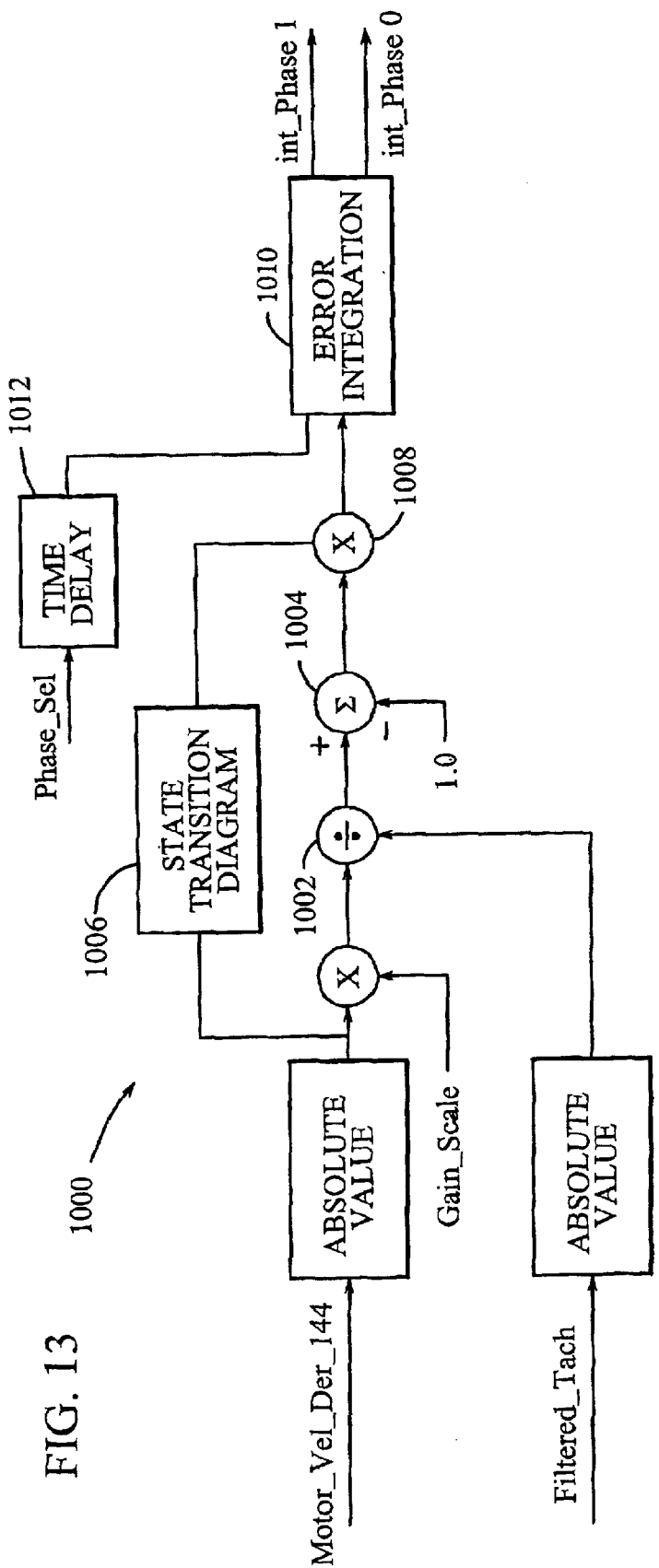
FIG. 13 depicts the Gain process.

Referring now to FIG. 13, the Gain 1000 process block where an error command is generated and subsequently utilized as a gain correction in the adaptive algorithm of the present invention. In a preferred embodiment, the error command is resultant from a ratiometric comparison 1002 of the magnitudes of the derived velocity to the filtered tachometer velocity. The ratio is then utilized to generate an error signal at summer 1004. Under predetermined conditions, controlled by state controller 1006, error modulator 1008 enables or disables the error signal. That is, modulator 1008 acts as a gate whereby the error signal is either passed or not. The state controller 1006 allows the error signal to be passed only when the error signal is valid. For example, when both the filtered tachometer velocity and the derived velocity are within a valid range. In a preferred embodiment, the error signal is passed when the magnitude of the Motor_Vel_Der_144 signal is between 16 and 66.4 radians per second. However, the modulator is disabled and the error signal does not pass if the magnitude of the Motor_Vel_Der_144 signal exceeds 72 or is less than 10.4 radians per second. Under these later conditions, the ratiometric comparison of the two velocities and the generation of an error signal is not valid. At very small velocities, the signal Motor_Vel_Der_144 exhibits excessive delay, while at larger velocities, that is in excess of 72 radians per second, the tachometer signals are saturated. The error signal when enabled is passed to the error integrator 1010, is integrated, and is utilized as an error command signal for gain adjustment feedback. The error integrators 1010 selectively integrate the error passed by the modulator 1008. The selection of which integrator to pass the error signal to is controlled by the time shifted Phase_Sel signal at delay 1012. These two correction signals int_Phase0 and int_Phase1 form the gain adjustment feedback that is then utilized as an input in the abovementioned Offset Compensation 200 process.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that those skilled in the art may conceive variations and modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A system for determining a velocity of a rotating device, comprising:

an apparatus having a rotational part including a set of sense magnets affixed to a rotating shaft of said rotating device configured to rotate about a rotation axis;

a circuit assembly, including a circuit interconnection having a plurality of sense coils, a sensor affixed to said circuit assembly, said circuit assembly adapted to be in proximity to said set of sense magnets;

wherein said set of sense magnets combines with said circuit assembly to form an air core electric machine such that voltages generated from each sense coil of said plurality of sense coils exhibits an amplitude proportional to said velocity;

a controller coupled to said circuit assembly, said controller adapted to execute an adaptive algorithm including:

receiving a position signal related to rotational position transmitted to said controller;

determining a derived velocity signal utilizing said position signal;
receiving a plurality of tachometer velocity signals;
determining a compensated velocity signal in response to said plurality of measured tachometer velocity signals;
blending said plurality of compensated velocity signals with said derived velocity signal under selective conditions to generate a blended velocity output indicative of said velocity of said rotating device.

2. The system of claim 1 wherein said derived velocity signal is determined as a difference between two measured positions of said rotating shaft divided by a time difference between said measured positions; and filtering a resultant of said calculation.

3. The system of claim 1 wherein said plurality of tachometer velocity signals are the resultant outputs of said plurality of sense coils configured such that voltages generated thereby are in quadrature.

4. The system of claim 1 wherein said voltages generated from each sense coil of said plurality of sense coils exhibit a trapezoidal waveform with an amplitude proportional to said velocity.

5. The system of claim 1 wherein said blended velocity output is generated by combining said derived velocity signal and said compensated velocity signal under selective conditions based upon characteristics of said derived velocity signal and said plurality of tachometer velocity signals.

6. The system of claim 1 wherein:
determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

7. The system of claim 6 wherein said extracting is accomplished by a selectable filter.

8. The system of claim 7 wherein said selectable filter conditionally subtracts low frequency spectral components from said plurality of tachometer velocity signals.

9. The system of claim 6 wherein said scaling is applied by a scale factor multiplication, where said scale factor is derived from an error determination process.

10. The system of claim 6 wherein said selecting includes selecting one tachometer velocity signals of said plurality of tachometer velocity signals based on magnitude.

11. The system of claim 6 wherein said calculated velocity error is responsive to a magnitude differential between said derived velocity signal and a time coherent version of said compensated velocity signal.

12. A method for determining a velocity of a rotating device, comprising:
generating a plurality of tachometer velocity signals and a position signal with an apparatus comprising:
a rotational part including a set of sense magnets affixed to a rotating shaft of said rotating device configured to rotate about a rotation axis;
a circuit assembly, including a circuit interconnection having a plurality of sense coils, a sensor affixed to said circuit assembly, said circuit assembly adapted to be in proximity to said set of sense magnets; and
wherein said set of sense magnets combines with said circuit assembly to form an air core electric machine such that voltages generated from each sense coil of said plurality of sense coils exhibits an amplitude proportional to said velocity;
executing an adaptive algorithm with a controller coupled to said circuit assembly, said controller:
receiving said position signal related to rotational position, and determining a derived velocity signal utilizing said position signal;
receiving said plurality of tachometer velocity signals;
determining a compensated velocity signal in response to said plurality of tachometer velocity signals; and
blending said plurality of compensated velocity signals with said derived velocity signal under selective conditions to generate a blended velocity output indicative of said velocity of said rotating device.

13. The method of claim 12 wherein said derived velocity signal is determined as a difference between two measured positions of said rotating shaft divided by a time difference between said measured positions; and filtering a resultant of said calculation.

14. The method of claim 12 wherein said plurality of tachometer velocity signals are the resultant outputs of said plurality of sense coils configured such that the voltages generated thereby are in quadrature.

15. The method of claim 12 wherein said voltages generated from each sense coil of said plurality of sense coils exhibit a trapezoidal waveform with an amplitude proportional to said velocity.

16. The method of claim 12 wherein said blended velocity output is generated by combining said derived velocity signal and said compensated velocity signal under selective conditions based upon characteristics of said derived velocity signal and said plurality of tachometer velocity signals.

17. The method of claim 12 wherein:
determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

18. The method of claim 17 wherein said extracting is accomplished by a selectable filter.

19. The method of claim 18 wherein said selectable filter conditionally subtracts low frequency spectral components from said plurality of tachometer velocity signals.

20. The method of claim 17 wherein said scaling is applied by a scale factor multiplication, where said scale factor is derived from an error determination process.

21. The method of claim 17 wherein said selecting includes selecting one tachometer velocity signals of said plurality of tachometer velocity signals based on magnitude.

22. The method of claim 17 wherein said calculated velocity error is responsive to a magnitude differential between said derived velocity signal and a time coherent version of said compensated velocity signal.

23. A storage medium encoded with a machine-readable computer program code;
wherein said code includes instructions for causing a controller to implement a method for determining a velocity of a rotating device comprising:
generating a plurality of tachometer velocity signals and a position signal with an apparatus comprising:
a rotational part including a set of sense magnets affixed to a rotating shaft of said rotating device configured to rotate about a rotation axis;

a circuit assembly, including a circuit interconnection having a plurality of sense coils, a sensor affixed to said circuit assembly, said circuit assembly adapted to be in proximity to said set of sense magnets;

wherein said set of sense magnets combines with said circuit assembly to form an air core electric machine such that voltages generated from each sense coil of said plurality of sense coils exhibits an amplitude proportional to said velocity;

executing an adaptive algorithm with a controller coupled to said circuit assembly, said controller:
receiving said position signal related to rotational position, and determining a derived velocity signal utilizing said position signal;
receiving said plurality of tachometer velocity signals;
determining a compensated velocity signal in response to said plurality of tachometer velocity signals; and
blending said plurality of compensated velocity signals with said derived velocity signal under selective conditions to generate a blended velocity output indicative of said velocity of said rotating device.

24. A storage medium of claim 23 wherein said blended velocity output is generated by combining said derived velocity signal and said compensated velocity signal under selective conditions based upon characteristics of said derived velocity signal and said plurality of tachometer velocity signals.

25. A storage medium of claim 23 wherein:
determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

26. A computer data signal embodied in a carrier wave;
wherein said data signal comprises code configured to cause a controller to implement a method for determining a velocity of a rotating device, comprises:
generating a plurality of tachometer velocity signals and a position signal with an apparatus comprising:
a rotational part including a set of sense magnets affixed to a rotating shaft of said rotating device configured to rotate about a rotation axis;
a circuit assembly, including a circuit interconnection having a plurality of sense coils, a sensor affixed to said circuit assembly, said circuit assembly adapted to be in proximity to said set of sense magnets;
wherein said set of sense magnets combines with said circuit assembly to form an air core electric machine such that voltages generated from each sense coil of said plurality of sense coils exhibits an amplitude proportional to said velocity;
executing an adaptive algorithm with a controller coupled to said circuit assembly, said controller:
receiving said position signal related to rotational position, and determining a derived velocity signal utilizing said position signal;
receiving said plurality of tachometer velocity signals;
determining a compensated velocity signal in response to said plurality of tachometer velocity signals; and
blending said plurality of compensated velocity signals with said derived velocity signal under selective conditions to generate a blended velocity output indicative of said velocity of said rotating device.

27. A computer data signal of claim 26 wherein said blended velocity output is generated by combining said derived velocity signal and said compensated velocity signal under selective conditions based upon characteristics of said derived velocity signal and said plurality of tachometer velocity signals.

28. A computer data signal of claim 26 wherein:
determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

29. A system for determining a velocity of a rotating device comprising:
an apparatus in operable communication with said rotating device for generating a plurality of tachometer velocity signals and a position signal;
a controller coupled to said apparatus, said controller adapted to execute an adaptive algorithm including:
receiving said position signal related to rotational position;
determining a derived velocity signal utilizing said position signal;
receiving a plurality of tachometer velocity signals; and
determining a compensated velocity signal in response to said plurality of measured tachometer velocity signals.

30. The system of claim 29 wherein an apparatus comprises a rotational part including a set of sense magnets affixed to a rotating shaft of said rotating device configured to rotate about a rotation axis.

31. The system of claim 30 wherein said apparatus comprises a circuit assembly, including a circuit interconnection having a plurality of sense coils, a sensor affixed to said circuit assembly, said circuit assembly adapted to be in proximity to said set of sense magnets.

32. The system of claim 31 wherein said set of sense magnets combines with said circuit assembly to form an air electric machine such that voltages generated from each sense coil of said plurality of sense coils exhibits an amplitude proportional to said velocity.

33. The system of claim 32 wherein said plurality of tachometer velocity signals are the resultant outputs of said plurality of sense coils configured such that voltages generated thereby are in quadrature.

34. The system of claim 31 wherein voltages generated from each sense coil of said plurality of sense coils exhibit a trapezoidal waveform with an amplitude proportional to said velocity.

35. The system of claim 29 wherein said derived velocity signal is determined as a difference between two measured positions of said rotating shaft divided by a time difference between said measured positions; and filtering a resultant of said calculation.

36. The system of claim 29 further including: said controller blending said plurality of compensated velocity signals with said derived velocity signal under selective conditions to generate a blended velocity output indicative of said velocity of said rotating device.

37. The system of claim 36 wherein said blended velocity output is generated by combining said derived velocity signal and said compensated velocity signal under selective conditions based upon characteristics of said derived velocity signal and said plurality of tachometer velocity signals.

38. The system of claim 29 wherein:
said determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

39. The system of claim 38 wherein said extracting is accomplished by a selectable filter.

40. The system of claim 39 wherein said selectable filter conditionally subtracts low frequency spectral components from said plurality of tachometer velocity signals.

41. The system of claim 38 wherein said scaling is applied by a scale factor multiplication, where said scale factor is derived from an error determination process.

42. The system of claim 38 wherein said selecting includes selecting one tachometer velocity signal of said plurality of tachometer velocity signals based on magnitude.

43. The system of claim 38 wherein said calculated velocity error is responsive to a magnitude differential between said derived velocity signal and a time coherent version of said compensated velocity signal.

44. A system for determining a velocity of a rotating device, comprising:
an apparatus in operable communication with said rotating device for generating a plurality of tachometer velocity signals and a position signal;
a controller coupled to said apparatus, said controller adapted to execute an adaptive algorithm including:
receiving said position signal related to rotational position;
determining a derived velocity signal utilizing said position signal;
receiving a plurality of tachometer velocity signals; and
blending said plurality of tachometer velocity signals with said derived velocity signal under selective conditions to generate a blended velocity output indicative of said velocity of said rotating device.

45. A method for determining a velocity of a rotating device, comprising:
receiving a position signal related to rotational position, and determining a derived velocity signal utilizing said position signal;
receiving a plurality of tachometer velocity signals; and
determining a compensated velocity signal in response to said plurality of tachometer velocity signals.

46. The method of claim 45 further including: generating said plurality of tachometer velocity signals and said position signal with an apparatus in operable communication with said rotating device, the apparatus comprising:
a rotational part including a set of sense magnets affixed to a rotating shaft of said rotating device configured to rotate about a rotation axis;
a circuit assembly, including a circuit interconnection having a plurality of sense coils, a sensor affixed to said circuit assembly, said circuit assembly adapted to be in proximity to said set of sense magnets; and
wherein said set of sense magnets combines with said circuit assembly to form an air electric machine such that voltages generated from each sense coil of said plurality of sense coils exhibits an amplitude proportional to said velocity.

47. The method of claim 46 wherein said plurality of tachometer velocity signals are the resultant outputs of said plurality of sense coils configured such that the voltages generated thereby are in quadrature.

48. The method of claim 46 wherein said voltages generated from each sense coil of said plurality of sense coils exhibit a trapezoidal waveform with an amplitude proportional to said velocity.

49. The method of claim 45 wherein said derived velocity signal is determined as a difference between two measured positions of said rotating device divided by a time difference between said measured positions; and filtering a resultant of said calculation.

50. The method of claim 45 further including: blending said plurality of compensated velocity signals with said derived velocity signal under selective conditions to generate a blended velocity output indicative of said velocity of said rotating device.

51. The method of claim 50 wherein said blended velocity output is generated by combining said derived velocity signal and said compensated velocity signal under selective conditions based upon characteristics of said derived velocity signal and said plurality of tachometer velocity signals.

52. The method of claim 45 wherein:
said determining said compensated velocity includes:
extracting respective offsets and biases from said plurality of tachometer velocity signals;
scaling said plurality of tachometer velocity signals to produce a plurality of scaled velocity signals;
selecting one scaled velocity signal of said plurality of scaled velocity signals as said compensated velocity signal; and
wherein said scaling is responsive to calculated velocity errors.

53. The method of claim 52 wherein said extracting is accomplished by a selectable filter.

54. The method of claim 53 wherein said selectable filter conditionally subtracts low frequency spectral components from said plurality of tachometer velocity signals.

55. The method of claim 52 wherein said scaling is applied by a scale factor multiplication, where said scale factor is derived from an error determination process.

56. The method of claim 52 wherein said selecting includes selecting one tachometer velocity signals of said plurality of tachometer velocity signals based on magnitude.

57. The method of claim 52 wherein said calculated velocity error is responsive to a magnitude differential between said derived velocity signal and a time coherent version of said compensated velocity signal.

58. A method for determining a velocity of a rotating device, comprising:
receiving a position signal related to rotational position, and determining a derived velocity signal utilizing said position signal;
receiving a plurality of tachometer velocity signals;
blending said plurality of tachometer velocity signals with said derived velocity signal under selective conditions to generate a blended velocity output indicative of said velocity of said rotating device.

59. A storage medium encoded with a machine-readable computer program code;
   wherein said code includes instructions for causing a controller to implement a method for determining a velocity of a rotating device comprising:
   receiving a position signal related to rotational position, and determining a derived velocity signal utilizing said position signal;
   receiving a plurality of tachometer velocity signals; and
   determining a compensated velocity signal in response to said plurality of tachometer velocity signals.

60. A storage medium of claim 59 wherein said blended velocity output is generated by combining said derived velocity signal and said compensated velocity signal under selective conditions based upon characteristics of said derived velocity signal and said plurality of tachometer velocity signals.

61. A storage medium of claim 59 wherein:
   said determining said compensated velocity includes:
      extracting respective offsets and biases from said plurality of tachometer velocity signals;
      scaling said plurality of tachometer velocity signals to produce a plurality of scaled velocity signals;
      selecting one scaled velocity signal of said plurality of scaled velocity signals as said compensated velocity signal; and
      wherein said scaling is responsive to calculated velocity errors.

62. A computer data signal embodied in a carrier wave;
   wherein said data signal comprising code configured to cause a controller to implement a method for determining a velocity of a rotating device, comprising:
   receiving a position signal related to rotational position, and determining a derived velocity signal utilizing said position signal;
   receiving a plurality of tachometer velocity signals; and
   determining a compensated velocity signal in response to said plurality of tachometer velocity signals.

63. A computer data signal of claim 62 wherein said blended velocity output is generated by combining said derived velocity signal and said compensated velocity signal under selective conditions based upon characteristics of said derived velocity signal and said plurality of tachometer velocity signals.

64. A computer data signal of claim 62 wherein:
   said determining said compensated velocity includes:
      extracting respective offsets and biases from said plurality of tachometer velocity signals;
      scaling said plurality of tachometer velocity signals to produce a plurality of scaled velocity signals;
      selecting one scaled velocity signal of said plurality of scaled velocity signals as said compensated velocity signal; and
      wherein said scaling is responsive to calculated velocity errors.

* * * * *